Figure 1:
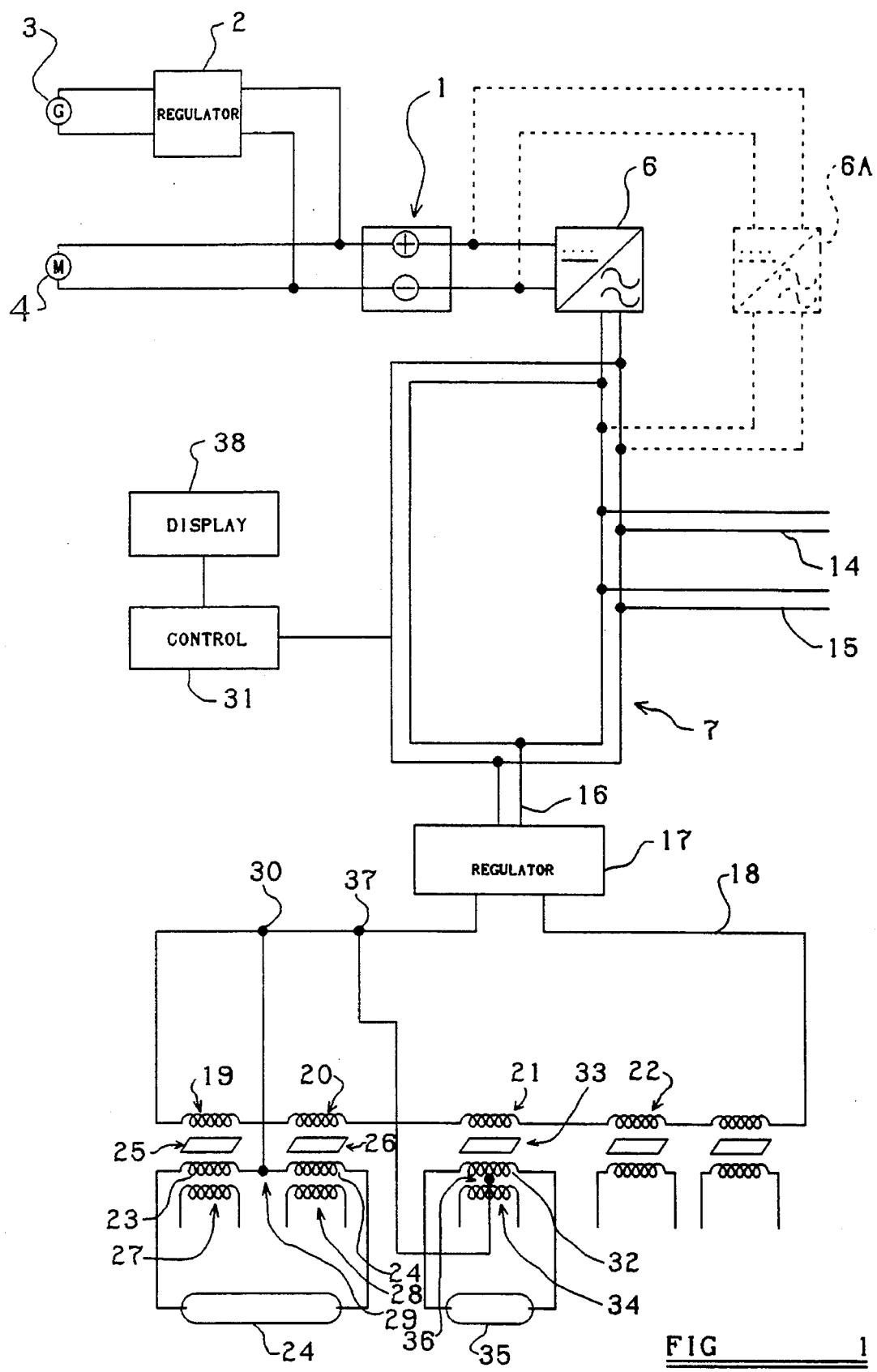

United States Patent [19]

Rimmer

[11] Patent Number: 5,465,010
[45] Date of Patent: Nov. 7, 1995

[54] ELECTRICAL [ARRANGEMENT] DISTRIBUTION SYSTEM FOR VECHICLE

[75] Inventor: Philip J. Rimmer, London, England

[73] Assignee: Tunewell Technology Ltd., London, England

[21] Appl. No.: 68,972

[22] Filed: May 28, 1993

[30] Foreign Application Priority Data

Mar. 1, 1993 [GB] United Kingdom ............... 9304132

[51] Int. Cl.⁶ ........................................... B60L 1/00
[52] U.S. Cl. ........................... 307/9.1; 307/10.1; 307/112; 323/249; 323/302
[58] Field of Search .................. 307/9.1, 10.1, 307/10.6, 10.8, 147, 17, 38, 39, 40, 155, 157, 11, 31, 36, 42; 323/249, 302, 329, 251, 253, 135–136, 266; 363/90, 91, 131–133, 135–136; 315/219; 361/42, 49, 119; 123/601, 621, 622

[56] References Cited

U.S. PATENT DOCUMENTS

| | | | |
|---|---|---|---|
| 1,612,387 | 12/1926 | Machlett | 315/246 |
| 2,313,961 | 3/1943 | Oglesbee | 315/277 |
| 3,544,803 | 12/1970 | Taylor | 307/10 |
| 3,683,267 | 8/1972 | Akamatsu | 363/135 |
| 3,697,767 | 10/1972 | Fioravant | 307/10 |
| 3,891,965 | 6/1975 | Schroeder | 340/52 |
| 4,262,212 | 4/1981 | Jacob et al. | 307/9.1 |
| 4,370,561 | 1/1983 | Briggs | 307/9.1 |
| 4,375,077 | 2/1983 | Williams | 363/91 |
| 4,562,382 | 12/1985 | Elliott | 315/219 |
| 4,598,331 | 7/1986 | Legatti | 361/46 |
| 4,697,094 | 9/1987 | Palazzetti | 307/40 |
| 4,800,476 | 1/1989 | Harada et al. | 363/134 |
| 4,841,428 | 6/1989 | Wahsburn et al. | 363/75 |
| 4,859,914 | 8/1989 | Summa | 315/354 |
| 5,019,751 | 5/1991 | Flory, IV et al. | 315/290 |
| 5,173,643 | 12/1992 | Sullivan et al. | 315/276 |

FOREIGN PATENT DOCUMENTS

| | | |
|---|---|---|
| 128574 | 12/1984 | European Pat. Off. . |
| 0408121 | 7/1990 | European Pat. Off. . |
| 443342 | 8/1991 | European Pat. Off. . |
| 1065883 | 9/1959 | Germany . |
| 2801122 | 7/1979 | Germany . |
| 2132821 | 7/1984 | United Kingdom . |

*Primary Examiner*—William M. Shoop, Jr.
*Assistant Examiner*—Peter Ganjoo
*Attorney, Agent, or Firm*—Brooks & Kushman

[57] ABSTRACT

An electrical arrangement is disclosed for use in supplying electrical power to the units in a motor vehicle. The arrangement comprises a battery, and an inverter to receive power from the battery and to generate a high frequency signal at an intermediate voltage higher than the voltage of the battery. There is a distribution network to distribute the high frequency signal to the units in the vehicle. At least some of the units supplied with electrical power are provided with step-up transformers to step-up the intermediate voltage to a higher voltage, that higher voltage being used by the units.

20 Claims, 4 Drawing Sheets

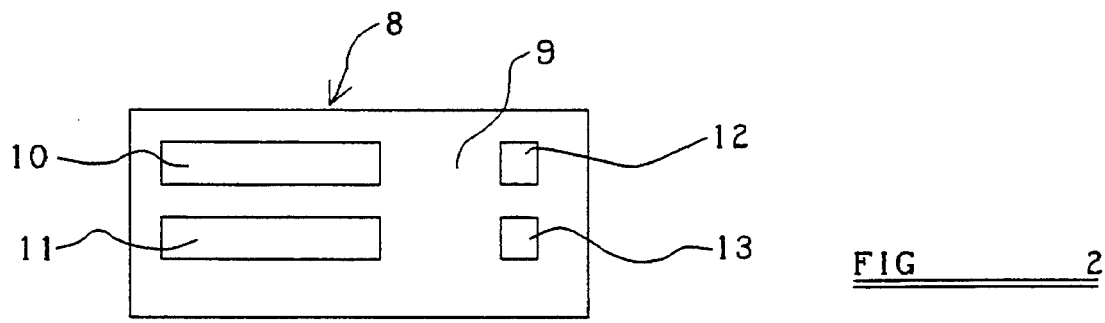
FIG 2
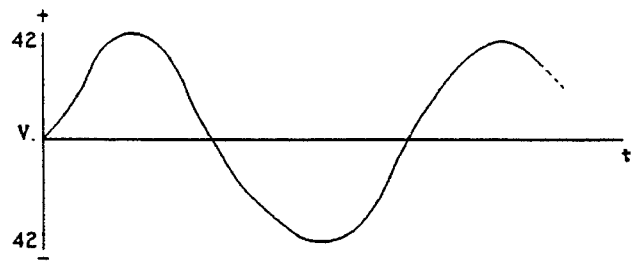
FIG 3a
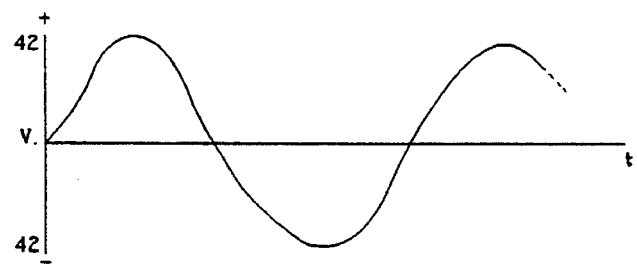
FIG 3b
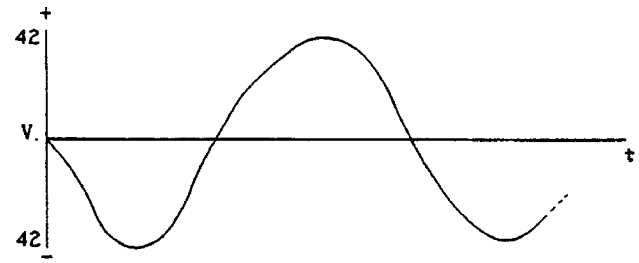

ELECTRICAL [ARRANGEMENT] DISTRIBUTION SYSTEM FOR VECHICLE

The present invention relates to an electrical arrangement and more particularly relates to an electrical arrangement for use in a vehicle such as a motor car, an automobile, a lorry or a truck.

For many years vehicles of the type described above have been provided with a complex wiring harness or wiring loom. The wiring harness or loom contains a large number of wires which serve to connect, individually, each unit in the vehicle which consumes power with the main power supply. The units that consume power comprise the individual lamps present on the exterior and interior of the vehicle, the in-car entertainment system, and, in certain cases, motors which adjust the positioning of various elements within the vehicle including motors which adjust the position of the mirrors, motors which adjust the position of the windows and motors which adjust the position of the seats.

It has been proposed to reduce wiring harness complexity by replacing the individual wires of the harness with a single power "bus" and a separate control "bus". Power is then fed to each device which utilises power through the power bus, and coded signals are supplied to the control bus. Localised signal de-coders and semi-conductor power switches are used to activate and deactivate the various items that consume power in response to signals present on the control bus.

Although complexity is reduced with this approach, and the various advantages of "intelligent control" may be reaped, various disadvantages are incurred. The semi-conductor switches may be found to be a major source of unreliability and voltage regulation on some functions may be impaired as functions will interfere with each other very readily. A cost incurred at each switched location, and the total copper content of the wiring harness may not be reduced, since the power bus must be able to withstand the maximum load, meaning that very substantial wires must be used in the power bus. Indeed, the copper content may be increased.

The present invention seeks to provide an improved electrical arrangement.

According to one aspect of this invention there is provided an electrical arrangement for use in supplying electrical power to units in a motor vehicle, the arrangement comprising a battery, an inverter to receive power from the batter and to generate a high frequency signal at an intermediate voltage higher than the voltage of the battery, and a distribution network to distribute the high frequency signal to the units in the vehicle.

Preferably at least some of the units supplied with electrical power are provided with step-up transformer means adapted to step-up the intermediate voltage to a higher voltage.

Conveniently the distribution network is in the form of a ring main.

Advantageously power from the distribution network is supplied through a current regulator to a constant current loop, the constant current loop containing the primary winding of one or more transformers each associated with a unit to which electrical power is to be supplied.

Preferably a unit which is to be provided with power from the distribution network is associated with a transformer operatively connected between the distribution work and the unit, the transformer having a primary winding to which current is supplied by the distribution network, and a secondary winding, the output of which is connected to the unit, there being a saturable core operatively located between the primary winding and the secondary winding, there being a control winding associated with the core adapted to substantially saturate the core so that, insufficient power is supplied to the unit to activate the component, and to un-saturate the core so that sufficient power is supplied to the unit to activate the unit.

Conveniently a unit to receive power from the distribution network comprises a discharge lamp, the discharge lamp being provided with respective transformer means associated with each of the electrodes of the discharge lamp, the transformer means each having primary windings adapted to receive current from the distribution network.

Preferably a unit to receive power from the distribution network comprises a discharge lamp. of the type which requires a high voltage to re-strike the lamp when the lamp is hot, the said lamp being provided with transformer means, the primary winding of which is adapted to receive current from the distribution network and the secondary winding of which is adapted to supply power to the lamp, the lamp being associated with a further arrangement adapted to provide an additional voltage across the lamp when the lamp is to be "struck" when hot, comprising further transformer means having a primary winding adapted to receive current from the distribution network and having transformer means having a secondary winding in series with the lamp.

Advantageously means are provided between the transformer means having the primary winding associated with the distribution network and the transformer means having the secondary winding in series with the lamp adapted to step-up the voltage.

Conveniently the or each transformer is a current transformer.

Preferably means are provided to monitor the current and/or voltage conditions prevailing when any unit is activated, and for determining whether those conditions fall within predetermined limits.

Conveniently display means are provided to provide a display when the operating conditions do not fall within predetermined limits.

Preferably means are provided to deactivate a component if the operating conditions of that unit are determined not to fall within said predetermined limits.

Conveniently earth leakage detection means are provided to determine when an earth leakage current flows, means being provided to deactivate at least part of the arrangement where an earth leakage current is occurring in response to the detection of such earth leakage current.

Advantageously means are provided to determine an open-circuit fault, and to terminate the flow of power to the part of the arrangement having the open-circuit fault.

Preferably wherein the means to determine an open-circuit fault comprise back-to-back diodes extending from a high tension lead of a component and extending to earth to enable an open-circuit fault to simulate an earth leakage current.

Conveniently the said units comprise one or more lights for the vehicle.

Preferably the units comprise in-car entertainment.

Advantageously the said units comprise spark plugs or other ignition devices.

Preferably the distribution network comprises a cable comprising an integral insulating sheath containing four cores, two cores being adapted to carry the output of the inverter, and two cores being adapted to carry control signals.

Conveniently the said cable is of substantially rectangular cross-section, adhesive being applied to one face of the cable to enable the cable to be located easily in position.

Advantageously a "stand by" inverter is provided, means being provided to activate the "stand by" inverter should the said inverter fail.

According to another aspect of this invention there is provided an arrangement for controlling an electric discharge lamp, the arrangement comprising a power source, and transformer means between the power source and the discharge lamp to supply power to the discharge lamp, the transformer means incorporating a primary winding and a secondary winding associated with a saturable core, and a control winding, the control winding being adapted to be energised substantially to saturate the core, the core being substantially unsaturated when the control winding is not energised so that when the control winding is energised and the primary winding of the transformer receives a current flow the voltage present across the secondary winding of the transformer is not sufficient to activate the discharge lamp, and, when the flow of current through the control winding is terminated, when there is a flow of current through the primary winding of the transformer, sufficient voltage is generated across the secondary winding of the transformer to activate the discharge lamp.

Figure 4:
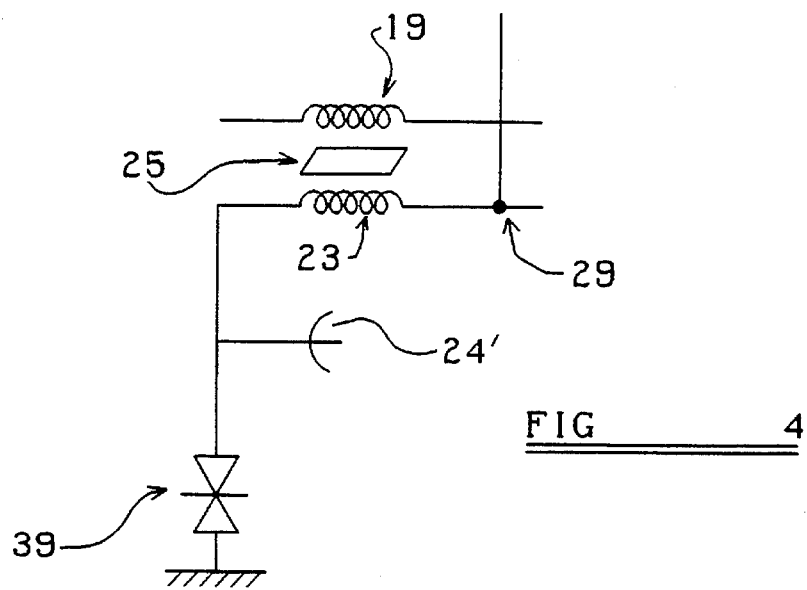
Figure 5:
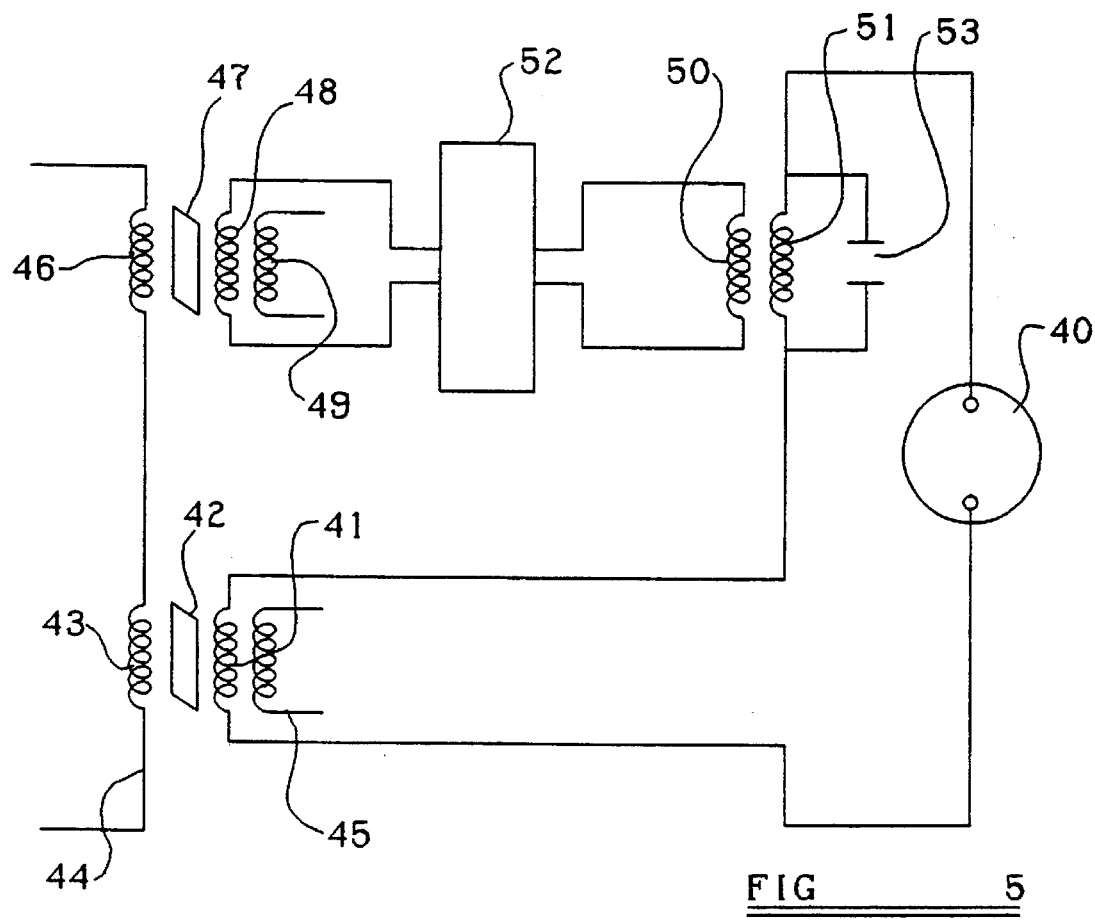
Figure 6:
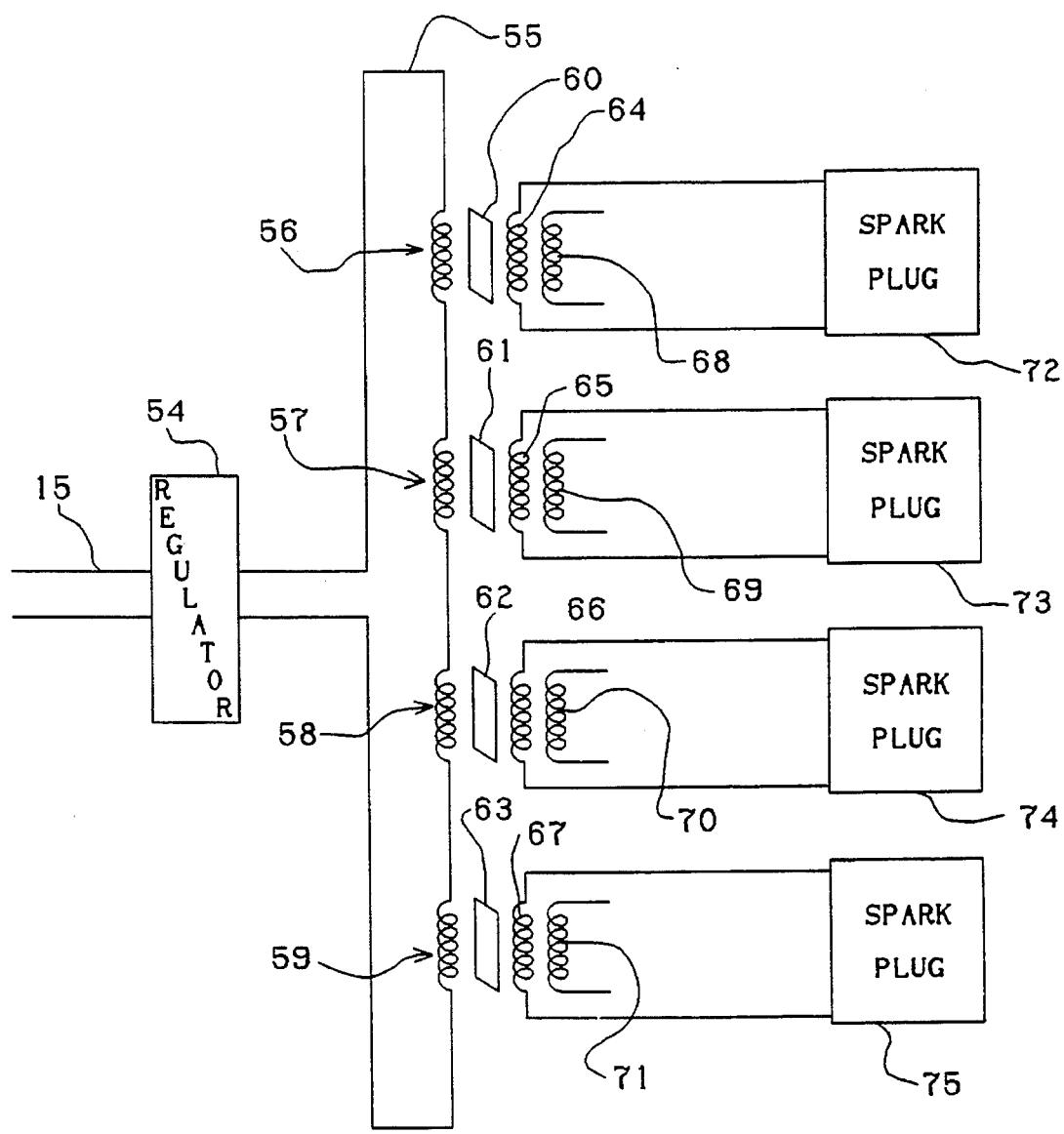

In order that the invention may be more readily understood, and so that further features thereof may be appreciated, the invention may be now be described, by way of example, with reference to the accompanying drawings in which:

FIG. 1 is a block circuit diagram of an electrical arrangements in accordance with the invention, FIG. 2 is a cross-sectional view of part of the cable used in FIG. 1, FIGS. 3A and 3B are graphical figures illustrating single phase and bi-phase signals, FIG. 4 is a circuit diagram of part of a modified embodiment of the invention, FIG. 5 is a circuit diagram of part of part of another modified embodiment illustrating a facility for "hot restrike", and FIG. 6 is a simplified circuit of an ignition system utilizing the present invention.

Referring initially to FIG. 1 of the accompanying drawings, in an electrical arrangement in accordance with the invention, in the form of an arrangement for use in supplying electrical power to electrically powered units within a motor vehicle, a battery 1, of conventional form, is provided. The terminals of the battery are connected, by means of an appropriate regulator 2, to a generator or alternator 3 which supplies electric power when the motor of the vehicle is operational, and which thus maintains the charge present within the battery. The battery is also connected directly to a starter motor 4. It is to be appreciated that when the generator 3 is operated large voltage "spikes" may appear, even with the regulator 2 being present, and when the starter motor 4 is activated there may be a substantial drain of power. These units are therefore connected directly to the battery, which is of low impedance, so that the effect of the operation of these units is not felt in the remaining part of the arrangement which will now be described.

The terminals of the battery are connected to a high frequency inverter 6. The output of the inverter 6 is supplied to a distribution network which in this embodiment is illustrated as comprising a ring main 7.

The ring main 7 may be made of ribbon-like cable 8, as shown in cross-section in FIG. 2. The cable 8 may therefore comprise a single resistive sheath 9 surrounding two conductive tracks 10,11 adapted to carry "power" and two conductive tracks 12,13, of smaller cross-section than the tracks 10,11, adapted to carry control signals, as will be described in more detail hereinafter.

The inverter 6 is adapted to provide an output, to the ring main 7, at a high frequency. The output voltage of the inverter may be, for example, 42 volts, but the voltage may be selected to be any desired voltage. Preferably the voltage is higher than 24 volts.

The output of the inverter may be a single phase output or a bi-phase output. If reference is made to FIG. 3A, details of a single phase output are illustrated graphically, where the voltage present on a track is plotted, against time, for both of the tracks 10 and 11. It can be seen that one track carries an alternating signal which has a maximum positive amplitude of 42 volts and a maximum negative amplitude of 42 volts, and the other track is maintained at a constant potential.

If reference is made to FIG. 3B a corresponding pair of graphs is provided for a bi-phase output. It can be seen that on each of the tracks 10 and 11 an alternating signal is provided having a maximum positive voltage of 42 volts and a maximum negative voltage of 42 volts. However, the signals are in anti-phase so that the maximum peak-to-peak voltage is 84 volts.

The inverter 6 may incorporate an appropriated regulator to regulate the output voltage, as is known, and as will be described hereinafter may be "fault protected".

It used to be appreciated that the distribution network or ring main 7 may extend throughout the motor vehicle, passing in the region of all the electrical units which are to receive power from the distribution network. If a cable 8 having a cross-section as shown in FIG. 2 is utilised, the relatively small cross-section of the cable and the flat profile may make it easy to feed the cable through the vehicle, under headlining and in other positions where space is restricted. The cable may, for example, have adhesive pre-applied to one face of the cable, thus enabling the cable to be retained in position in an easy manner without the need for cable ties or the like.

The "ring main" 7 is provided with various "break outs" 14,15,16 which lead power from the "ring main" 7 to various points where the power is to be utilised. The "break out" 16 is connected to a current regulator 17 which may be a magnetic current regulator for robustness. The current regulator is adapted to provide a substantially constant current to a current loop 18 which is connected to the output of the current regulator.

The loop 18 contains, in series, the primary windings 19,20,21,22 etc. of a plurality of transformers. These transformers, as will be described, are associated with individual units which are powered by the described arrangement, the units comprising lamps which are, typically, discharge lamps.

The primary windings 19,20 are associated with respective secondary windings 23,24 which are located adjacent the ends of a discharge lamp 24'. The windings 23 and 24 are connected in series, and are also connected to the electrodes of the discharge lamp 25. Located between the primary winding 19 and the secondary winding 23 is a saturable magnetic core 25 and a similar core 26 is located between the primary winding 20 and the secondary winding 24. A control winding 27 is provided which is co-wound with the primary winding 19 and the secondary winding 23. A further control winding 28 is provided which is co-wound with the primary winding 20 and the secondary winding 24.

A node 29 located between the secondary winding 23 and the secondary winding 24 is connected to a point 30 on the loop 18 which is connected directly to the current regulator 17.

A control device 31 is provided which is adapted to supply current to the control windings 27 and 28. The control device 31 will apply coded signals to the tracks 12 and 13 on the bus. The coded signals are received by local de-coding stations located adjacent the units to be powered. Each de-coder reacts in a predetermined way to a predetermined signal. Thus the control device transmits an appropriate signal, which is de-coded by a de-coder associated with the central windings 27 and 28 and which supplies current to these windings. When current is supplied to the windings 27 and 28 the cores 25 and 26 become substantially saturated. Whilst the high frequency regulated current flows through the windings 19 and 20 will still excite some current in the secondary windings 23 and 24, the voltage generated across the combination of the windings 23 and 24 is not sufficiently great to "strike" the discharge lamp 24' nor is the voltage sufficient to maintain the discharge lamp 24' in the "struck" condition. Thus, whenever the appropriate current flows through the windings 27 and 28 in response to signals from the control 31 the discharge lamp 24' is not struck. However, when the discharge lamp 24' is to be struck, the flow of current through the windings 27 and 28 is terminated, which significantly reduces the degree of saturation of the cores 25 and 26, thus allowing the output voltage of the combined secondary windings 23 and 24 to rise above the critical voltage necessary for the lamp 24' to strike, and consequently the lamp 24' is immediately illuminated.

It is to be appreciated that the "magnetic" switches which have been described above, are able to handle significant quantities of power with no major problems arising, in contra-distinction to solid state switches where either very expensive switches have to be used or problems can arise.

Whilst the arrangement described immediately above involves the use of two transformers located at the opposed ends of a discharge lamp, it is to be appreciated that a discharge lamp using a single transformer may be utilised. See, for example, the winding 21 present in the controlled current loop 18, which is associated with a secondary winding 32, there being a core 33 of saturable material between the windings 21 and 22. A control winding 34 is provided which is co-wound with the primary winding 21 and the secondary winding 32. The two ends of the winding 32 are connected to the electrodes of a discharge lamp 35. A node 36 provided at the centre of a secondary winding 32 is connected to a point 37 on part of the current regulated loop 18 which is connected directly to the current regulator 17.

It is to be appreciated that the control 31 will provide a current passing through the core 34 to maintain the core 33 substantially saturated, and when the core is substantially saturated in this way the voltage generated across the secondary coil 32 is not sufficiently great to "strike" the discharge lamp 35. However, if the current 34 is terminated, then the core 33 becomes substantially unsaturated enabling the output voltage on the winding 32 to rise, so that the lamp 35 can then be struck.

It is to be appreciated that the magnetic switches described above are fast-acting and a lamp may be fully illuminated within a matter of a very few milliseconds. This is to be compared with an incandescent lamp where a filament in the lamp has to heat up to a predetermined temperature before the lamp emits light. It can take a significant period of time for a lamp of this type to be illuminated. If the lamp in question is the brake light of a vehicle, the vehicle may have travelled a significant distance before the brake light becomes illuminated. More importantly, a following vehicle, travelling at the same speed as the vehicle provided with the lamp, will also have travelled an equivalent distance before the driver of the following vehicle can even begin to observe the illumination of the brake light of the preceding vehicle. It is thus to be appreciated that significant benefits can follow from utilising a lamp which can be illuminated virtually immediately in response to an appropriate control signal.

In the described embodiment the lamp 24' may comprise, for example, the "brake" light of a vehicle, and the lamp "35" may comprise the "tail" light of the vehicle. The further primary windings 22 etc. present in the constant current loop 18 may be associated, for example, with a fog lamp, a reversing lamp and an indicator lamp.

It is to be appreciated that a single current regulator 17 may be associated with a controlled current loop which contains primary windings associated with all the lamps present in the two lamp clusters conventionally provided at the rear of a vehicle, or a separate current regulator may be provided for each lamp cluster. These are matters of mere design convenience.

It is to be appreciated that the transformers are tightly coupled and are current transformers. The tube currents of the discharge lamps are thus precisely defined by the ratio of the primary turns to secondary turns of each transformer and the current flow through the primary winding. The current flowing through the primary winding, in each case, is regulated by the current regulator 17 and thus an identical current flows through each primary winding.

The voltage required to "strike" a lamp may be somewhat higher than the voltage needed to maintain the lamp in an operational condition. It is possible for a plurality of lamps to be required to be illuminated "simultaneously". One might, therefore, think it necessary to provide a current regulator adapted to handle a voltage which is equal to the sum of the maximum voltages required to "strike" each lamp at one time. However, in a preferred embodiment of the present invention, the control 31 is programmed so that if a number of lamps, such as the lamps 24' and 35 have to be illuminated "simultaneously" initially one lamp will be illuminated, and then a second lamp will be illuminated and so-on. Since it only takes a very brief period of time for a lamp to be illuminated, measured in terms of a very few milliseconds, the lamps will be effectively illuminated "simultaneously" but the current regulator will only need to be able to handle a maximum voltage which is equal to the sum of the voltages necessary to maintain all the lamps illuminated plus the excess voltage necessary to illuminate one lamp. This can help minimise the cost of the current regulator.

The inverter 6 and/or current regulator 17 may be provided with means to monitor the current and the voltage. When any particular lamp is illuminated, the current and the voltage may be monitored to ensure that the current and voltage are within predetermined limits. If, for example, a lamp has become damaged or broken, then that lamp will not "strike" when the core of the associated transformer is un-saturated by the cessation of current flow through the appropriate control winding by the control 31. In this situation the current regulator 17 will effectively "observe" operating conditions which are not within the predetermined limits. The current regulator may be adapted to provide a signal indicative of such an occurrence to the control 31. The control 31 may be programmed so that it subsequently does not try again to activate that particular lamp, since the lamp may have been damaged due to an accident, and the electrodes of the lamp, which carry a high potential when the lamp is activated, may be exposed.

In such circumstances the control 31 may provide a warning on a display 38 provided, for example, on the dashboard of the vehicle.

A control 31 may also be adapted so that, whenever the ignition of the motor vehicle is turned on, the control carries out a "diagnostic" procedure, activating each light within the vehicle, and monitoring the resultant voltage and current conditions in order to check that the voltage and current conditions for each lamp fall within the predetermined limits. This procedure can be repeated several times to ensure accuracy. Should any lamp to be such that the operating conditions do not fall within the predetermined limits, the control will ensure that subsequent to the initiating procedure the lamp in question is not activated again and the appropriate warning is supplied on the display 38.

It is to be noted that the connections between the nodes 29 and 30 and the connection between the node 36 and 37 facilitate the operation of a sensor present in the inverter 6 or the regulator 17 which senses an earth leakage current. Such a current can arise if any part of the circuitry, and in particular the electrodes of the lamps are, in some way, in contact with "earth".

A similar signal can be derived from an open circuit fault if back-to-back diodes 39 are connected, for example, between the electrode of the lamp 24' associated with the winding 23 as can be shown in FIG. 4, or as an equivalent position in connection with any other lamp. The back-to-back diode combination 38,39 is intended to break down below the open circuit voltage of the transformer constituted by the windings 19,23, but at a voltage which is above the "strike" voltage of the tube.

Thus, if the described circuit is provided with back-to-back diode corresponding to the diodes 39 at appropriate positions, should any "open circuit" fault appear, this will effectively simulate a "earth leakage" current.

The control 31 is adapted to respond to an "earth leakage" current being detected by the inverter 6 or the regulator 17 by carrying out a diagnostic routine, activating each lamp in turn and determining whether the operating conditions of voltage and current of that lamp are within the predetermined range, and thus control will be able to determine where any fault or faults have occurred. The areas where the fault or faults have occurred may thus effectively be de-activated by the control and an appropriate warning may be provided on the display 38.

It is important to note that the back-to-back diode arrangement must be asymmetric, and should thus only be connected to one electrode of each lamp.

Returning to FIG. 1, an auxiliary inverter 6A may be provided adapted to be "switched in" by the control 31 should the primary inverter 6 fail for any reason.

Referring now to FIG. 5 is to be appreciated that whilst, in the foregoing description, the situation relating to a lamp cluster at the rear of a vehicle has received attention, in a lamp cluster at the front of a vehicle a special type of discharge lamp 40 may be utilised which has properties such that the lamp may be difficult to re-strike if it is warm.

As can be seen from FIG. 5, the lamp 40 is connected in series with a secondary winding 41 of a transformer which has a saturable core 42 and a primary winding 43, the primary winding 43 being present in a regulated current loop 44 which corresponds effectively with the regulated current loop 18 described in FIG. 1.

A control winding 45 is provided for the transformer, and the primary winding 43, the secondary winding 41 and the control winding 45 are co-wound about the saturable core 42. The lamp 40 may thus be operated in a manner described above by terminating the flow of current through the control winding 45 when the lamp is to be illuminated, thus permitting the core 42 to become substantially un-saturated, enabling the secondary winding 41 to provide an output voltage which is sufficient to strike the lamp 40.

Whilst the output voltage of the secondary winding 41 is sufficient to strike the lamp 40 when the lamp is cold, if the lamp is hot, and has just ceased a period of operation, it may be necessary to provide the lamp with an additional voltage in order to strike the lamp. In order to provide this additional voltage the regulator current loop 44 contains another primary winding 46 which is associated, by means of a saturable core 47, with a secondary winding 48, there being a control winding 49. The control winding 49 receives a current which maintains the core 47 substantially saturated until the current through the winding 49 is terminated. The winding 48 may be connected directly to a primary winding 50 which is associated with a secondary winding 51 connected in series with the lamp 40. The arrangement may thus be such that when the control current through the winding 49 ceases, a pulse of current flows in the secondary winding 48 and thus in the primary winding 50, generating a sufficient voltage across the primary winding 51 to activate the lamp 40, even though the lamp 40 is hot. However, the voltage necessary may be as high as 27 kv and it is thus envisaged that it may be necessary to incorporate, between the secondary winding 48 and the primary winding 50, circuitry illustrated schematically at 52 to further "step-up" the voltage provided on the secondary winding 48. It is envisaged that the circuitry 52 may incorporate a capacitor adapted to be charged to an extremely high voltage which is then discharged swiftly to generate the appropriate voltage across the winding 51. It is thought possible that a capacitance 53 may be provided in parallel with the winding 51 in order to carry the "ordinary" current generated in the secondary winding 41, thus by-passing the winding 51 which may be of a relatively high resistance.

Whilst, in the foregoing description, specific reference has been made to various lighting arrangements of the vehicle being powered from the ring main 7, it is also to be appreciated that the ring main 7 may be utilised, with advantage, to provide a current for "in-car entertainment".

The amplifiers that are used, at the present time, in connection with "in-car entertainment" may have a significant power consumption, amplifiers consuming 100 watts or more being relatively common. It is difficult to provide such amplifiers with this level of current with a 12 volt supply. Whilst it is possible to utilise low impedance speakers, the quality of sound drops. The reason for this is that with a low impedance speaker, the ratio of speaker impedance to source impedance may drop, which means that "damping" control of the speaker is lost. Thus, for various reasons, it is preferred to use a high voltage for in-car entertainment. It is to be appreciated that an appropriate "break out" 14 or 15 may be supplied directly to in-car entertainment which may provide input current at a voltage of 42 volts (or 84 volts peak-to-peak if the inverter 6 is a bi-phase inverter). Of course this voltage may be stepped up by a transformer if required.

Referring to FIG. 6, in recent years there have been proposals to utilise high energy ignition systems, which can be important for lean burn engines. Essentially in such ignition systems the intensity and/or duration of the spark is increased to help ensure that all the fuel injected into the cylinder of the engine is actually ignited and burnt. High energy sparks are used, a typical spark having an energy of 100 watts, whereas previously a typical spark had an energy of 20 watts. It is to be appreciated that a further "break out" 15 from the ring main 7 may be provided to an ignition arrangement in a motor vehicle. The "break out" 15 may optionally pass through a current regulator 54 which is associated with a current regulated loop 55. The loop 55 includes primary windings 56,57,58 and 59 each associated with a saturable core 60,61,62,63 respectively, and being associated with a secondary winding 64,65,66,67 respectively. Each pair of windings is associated with a control winding 68,69,70,71 respectively and the windings are connected, respectively, to spark plugs 72,73,74,75. The control windings 68 to 71 may be controlled an appropriate control device, so that the saturable cores 60 to 63 respectively are sequentially un-saturated to permit current to flow thus generating a spark at the respective spark plugs 72 to 75 respectively. The duration of each spark may be controlled to be of any desired length.

What is claimed is:

1. An electrical arrangement for use in supplying electrical power to units in a motor vehicle, the arrangement comprising a battery, an inverter to receive power from the battery and to generate a high frequency signal at an intermediate voltage higher than the voltage of the battery, and a distribution network to distribute the high frequency signal to the units in the vehicle, the distribution network including a current regulator for establishing a constant current loop, the constant current loop containing the primary winding of two or more transformers, each transformer for activating and deactivating a unit associated therewith.

2. An arrangement according to claim 1 wherein at least some of the units supplied with electrical power are provided with step-up transformer means adapted to step-up the intermediate voltage to a higher voltage.

3. An arrangement according to claim 2 wherein the transformer is a current transformer.

4. An arrangement according to claim 1 wherein the distribution network is in the form of a ring main.

5. An arrangement according to claim 1 wherein the one or more transformers each associated with a unit includes a secondary winding, the output of which is connected to the unit, there being a saturable core operatively located between the primary winding and the secondary winding, there being a control winding associated with the core adapted to substantially saturate the core so that, insufficient power is supplied to the unit to activate the component, and to un-saturate the core so that sufficient power is supplied to the unit to activate the unit.

6. An arrangement according to claim 1 wherein a unit to receive power from the distribution network comprises a discharge lamp, the discharge lamp being provided with respective transformer means associated with each of the electrodes of the discharge lamp.

7. An arrangement according to claim 1 wherein a unit to receive power from the distribution network comprises a discharge lamp of the type which requires a high voltage to re-strike the lamp when the lamp is hot, the lamp being associated with a further arrangement adapted to provide an additional voltage across the lamp when the lamp is to be "struck" when hot, comprising second transformer means having a primary winding adapted to receive current from the distribution network and third transformer means having a secondary winding in series with the lamp.

8. An arrangement according to claim 7 wherein means are provided between the second transformer means having the primary winding associated with the distribution network and the third transformer means having the secondary winding in series with the lamp adapted to step-up the voltage.

9. An arrangement according to claim 1 wherein means are provided to monitor the current and/or voltage conditions prevailing when any unit is activated, and for determining whether those conditions fall within predetermined limits.

10. An arrangement according to claim 9 wherein display means are provided to provide a display when the operating conditions do not fall within predetermined limits.

11. An arrangement according to claim 9 wherein means are provided to deactivate a component if the operating conditions of that unit are determined not to fall within said predetermined limits.

12. An arrangement according to claim 1 wherein earth leakage detection means are provided to determine when an earth leakage current flows, means being provided to deactivate at least part of the arrangement where an earth leakage current is occurring in response to the detection of such earth leakage current.

13. An arrangement according to claim 12 wherein means are provided to determine an open-circuit fault, and to terminate the flow of power to the part of the arrangement having the open-circuit fault.

14. An arrangement according to claim 13 wherein the means to determine an open-circuit fault comprise back-to-back diodes extending from a high tension lead of a component and extending to earth to enable an open-circuit fault to simulate an earth leakage current.

15. An arrangement according to claim 1 wherein the said units comprise one or more lights for the vehicle.

16. An arrangement according to claim 1 wherein the units comprise in-car entertainment.

17. An arrangement according to claim 1 wherein the said units comprise spark plugs or other ignition devices.

18. An arrangement according to claim 1 wherein the distribution network comprises a cable including at least two cores being adapted to carry the output of the inverter, and at least one core being adapted to carry control signals.

19. An arrangement according to claim 18 wherein the said cable is of substantially rectangular cross-section, adhesive being applied to one face of the cable to enable the cable to be located easily in position.

20. An arrangement according to claim 1 wherein a "stand by" inverter is provided, means being provided to activate the "stand by" inverter should the said inverter fail.

* * * * *